United States Patent
Sugiyama et al.

(10) Patent No.: US 11,571,952 B2
(45) Date of Patent: Feb. 7, 2023

(54) HEAD UP DISPLAY DEVICE AND IMAGE DISPLAY APPARATUS THEREFOR

(71) Applicant: MAXELL, LTD., Kyoto (JP)

(72) Inventors: Toshinori Sugiyama, Kyoto (JP); Koji Hirata, Kyoto (JP); Yasuhiko Kunii, Kyoto (JP); Masahiko Yatsu, Kyoto (JP); Kazuomi Kaneko, Kyoto (JP)

(73) Assignee: MAXELL, LTD., Kyoto (JP)

( * ) Notice: Subject to any disclaimer, the term of this patent is extended or adjusted under 35 U.S.C. 154(b) by 986 days.

(21) Appl. No.: 16/330,392

(22) PCT Filed: Aug. 1, 2017

(86) PCT No.: PCT/JP2017/027834
§ 371 (c)(1),
(2) Date: May 24, 2019

(87) PCT Pub. No.: WO2018/047522
PCT Pub. Date: Mar. 15, 2018

(65) Prior Publication Data
US 2020/0189363 A1    Jun. 18, 2020

(30) Foreign Application Priority Data

Sep. 6, 2016    (JP) .............................. JP2016-173548

(51) Int. Cl.
*G02B 5/30* (2006.01)
*G02B 27/01* (2006.01)
*B60J 1/00* (2006.01)

(52) U.S. Cl.
CPC ............ *B60J 1/002* (2013.01); *G02B 5/3025* (2013.01); *G02B 27/0101* (2013.01)

(58) Field of Classification Search
CPC ..... B06J 1/002; G02B 5/3025; G02B 27/0101
(Continued)

(56) References Cited

U.S. PATENT DOCUMENTS

| 2006/0018119 A1 | 1/2006 | Sugikawa et al. |
| 2009/0153962 A1 | 6/2009 | Okada et al. |

(Continued)

FOREIGN PATENT DOCUMENTS

| CN | 103270436 A | 8/2013 |
| CN | 203909400 U | 10/2014 |

(Continued)

OTHER PUBLICATIONS

Chinese Office Action received in corresponding Chinese Application No. 201780054622.4 dated Apr. 2, 2021.
(Continued)

*Primary Examiner* — Charles S Chang
(74) *Attorney, Agent, or Firm* — Mattingly & Malur, PC

(57) ABSTRACT

A HUD device and an image display apparatus for solving a problem that a HUD image cannot be seen in a HUD device that displays a virtual image when wearing the sunglasses having polarization function are provided. A head up display device for a vehicle is provided with an image display apparatus configured to project an image onto a windshield or a combiner by polarized light and means of converting polarization of polarized light of the image projected from the image display apparatus, the means being provided on a part of a light path from the image display apparatus to the windshield or the combiner.

14 Claims, 10 Drawing Sheets

(58) Field of Classification Search
USPC .......................................................... 349/11
See application file for complete search history.

(56) References Cited

U.S. PATENT DOCUMENTS

| | | | |
|---|---|---|---|
| 2013/0279016 A1 | 10/2013 | Finger | |
| 2014/0184996 A1* | 7/2014 | Matsushita | G02B 27/0101 349/117 |
| 2015/0355461 A1* | 12/2015 | Kessler | G02B 27/0101 359/631 |
| 2016/0048017 A1 | 2/2016 | Kasahara et al. | |
| 2016/0091756 A1* | 3/2016 | Watano | G02B 5/30 349/185 |
| 2016/0195719 A1 | 7/2016 | Yonetani | |
| 2016/0327788 A1* | 11/2016 | Yamaoka | G02F 1/1335 |
| 2017/0045738 A1* | 2/2017 | Kim | G02B 5/30 |
| 2018/0180878 A1* | 6/2018 | Yokoe | G02B 27/286 |

FOREIGN PATENT DOCUMENTS

| | | |
|---|---|---|
| JP | 05-2118 U | 1/1993 |
| JP | 2009-128658 A | 6/2009 |
| JP | 2014-191143 A | 10/2014 |
| JP | 2015-007763 A | 1/2015 |
| JP | 2015-194707 A | 11/2015 |
| JP | 2015-225236 A | 12/2015 |

OTHER PUBLICATIONS

Chinese Office Action received in corresponding Chinese Application No. 201780054622.4 dated Sep. 16, 2021.
International Search Report of PCT/JP2017/027834 dated Oct. 31, 2017.

* cited by examiner (a)

(b)

(a)

(b)

COMPARATIVE EXAMPLE

HEAD UP DISPLAY DEVICE AND IMAGE DISPLAY APPARATUS THEREFOR

TECHNICAL FIELD

The present invention relates to a technique for a head up display (hereinafter, referred to as "HUD") device, and particularly relates to a technique effectively applied to a HUD device configured to project an image on a windshield (front glass) of a vehicle or a combiner which is a transparent or translucent plate-shaped display member installed immediately in front of it.

BACKGROUND ART

In a vehicle such as an automobile, information such as vehicle speed and engine speed is usually displayed on an instrument panel in a dashboard. In addition, information of a car navigation system or the like is displayed on a screen incorporated in the dashboard or installed on the dashboard. Since it is necessary to move a line of sight a lot when a driver visually recognizes the information, a HUD device which projects and displays information such as vehicle speed and information such as instruction relating to car navigation on a windshield (front glass) or a combiner has been known as a technique for reducing the amount of movement of the line of sight.

Note that, as a technique relating to the HUD device, for example, Japanese Patent Application Laid-Open Publication No. 2015-194707 (Patent Document 1) describes a display apparatus including a device to display an image and a projection optical system to project the image displayed on the display device, wherein a screen distortion can be reduced in an entire viewpoint area of a viewer and a size reduction can be achieved. Note that, in this prior art, the projection optical system includes a first mirror and a second mirror sequentially along the light path from the display device to the viewer. Further, the Patent Document 1 describes that the size reduction of the HUD device can be achieved by configuring the HUD device so that an incident angle in a long axis direction of an image in a first mirror, an incident angle in a short axis direction of the image in the first mirror, and a relation between an interval of an image display surface of the display device and the first mirror and a width of a virtual image visually recognized by the viewer in a horizontal direction satisfy a predetermined relationship.

RELATED ART DOCUMENTS

Patent Documents

Patent Document 1: Japanese Patent Application Laid-open Publication No. 2015-194707

SUMMARY OF THE INVENTION

Problems to be Solved by the Invention

In the conventional HUD device, for example, linearly polarized light such as s-polarized light to a reflection surface has generally been used as a light beam for displaying a virtual image in many cases in consideration of characteristics such as reflection.

On the other hand, vehicle drivers often use sunglasses having polarization function in order to selectively reduce the glare reflection from a road surface. However, as described later in detail, the conventional HUD device that displays the virtual image by the linearly polarized light described above has the problem that the driver cannot see the HUD image when wearing the sunglasses having polarization function.

Therefore, an object of the present invention is to provide a HUD device and an image display apparatus therefor, with which a user can see the HUD image even when wearing sunglasses having polarization function and which are modularized and reduced in size and have higher light use efficiency in comparison with the prior art described above.

Means for Solving the Problems

As an embodiment for achieving the object described above, according to the present invention, a head up display device for a vehicle comprising: an image display apparatus configured to project an image onto a windshield or a combiner by polarized light; and means configured to convert polarization of the polarized light of the image projected from the image display apparatus, the means being provided on a part of a light path from the image display apparatus to the windshield or the combiner, is provided.

Also, according to the present invention, an image display apparatus for a head up display device for a vehicle comprising: a light source; a collimator configured to convert light emitted from the light source into substantially parallel light; a light guide on which the light emitted from the collimator is incident and which emits the light in a direction different from an incident direction; and a polarization conversion element configured to uniform a polarization direction of the light to one direction is provided.

Effects of the Invention

According to the present invention described above, it is possible to realize the HUD device and the image display apparatus therefor, by which the problem in the prior art described above can be solved and which can be manufactured at low cost, are modularized and reduced in size and have high efficiency.

BRIEF DESCRIPTIONS OF THE DRAWINGS

Figure 13:
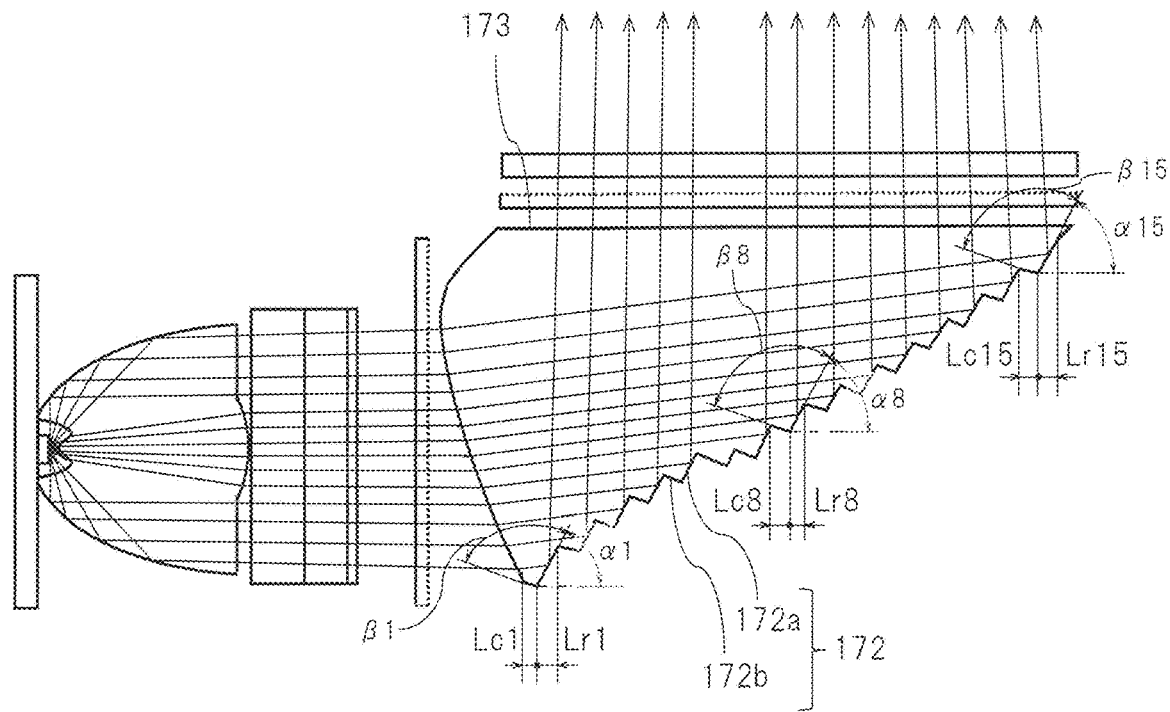
Figure 14:
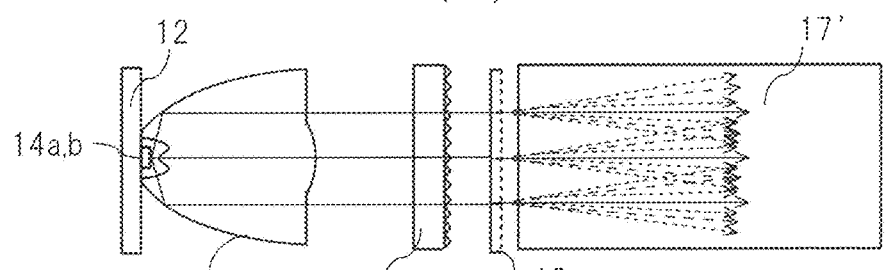
Figure 14:
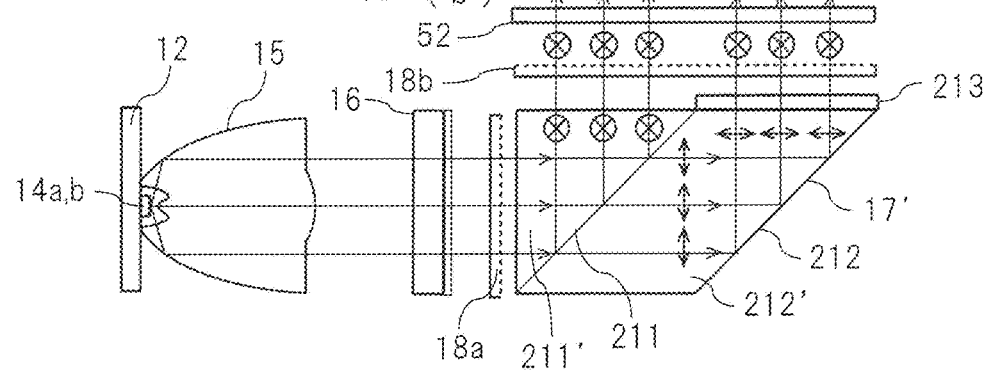

FIG. 13 is an enlarged cross-sectional view showing reflection surfaces and connection surfaces constituting the light guide and an example of setting of reflection of light beam in the image display apparatus according to the first embodiment; and FIG. 14 is a top view and a side cross-sectional view showing a configuration in an image display apparatus and a state of light beam according to another embodiment of the present invention.

DETAILED DESCRIPTION OF PREFERRED EMBODIMENTS

Hereinafter, embodiments of the present invention will be described in detail with reference to the drawings.

<Basic Configuration of HUD and Principle of Present Invention>

Figure 1:
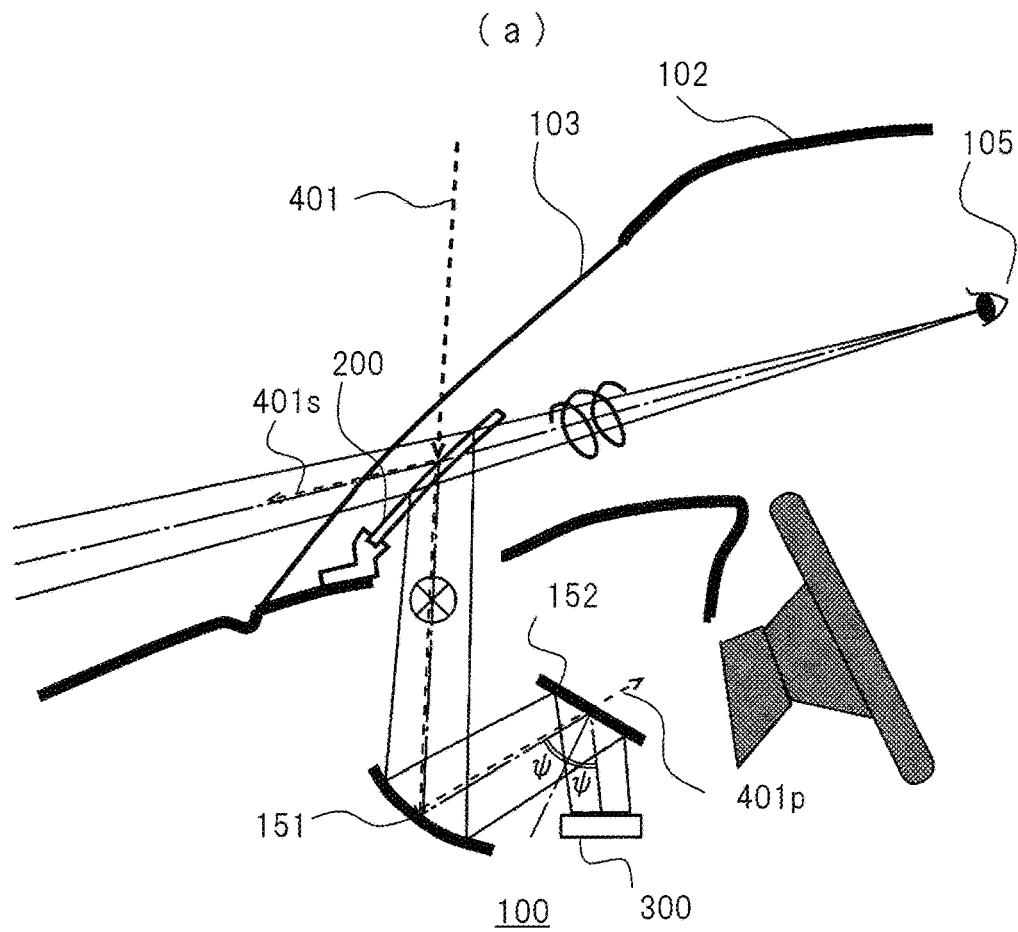
FIG. 1 is a diagram showing an example of a basic configuration of a HUD device and an internal configuration of an image display apparatus therefor according to the present invention.
Figure 1:
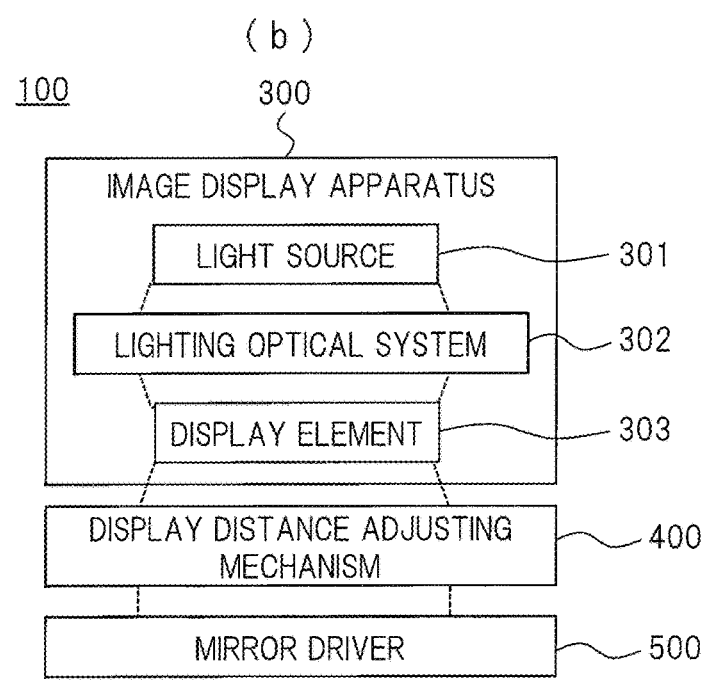

FIG. 1(*a*) shows a basic configuration of a HUD device according to the present invention. As can be seen from this drawing, a HUD device 100 basically projects a light (in this case, image light) from an image display apparatus 300 including a light source device configured of a projector or a LCD (Liquid Crystal Display) onto a windshield 103 of a vehicle 102 or a combiner 200 installed immediately in front of it through the reflection of a mirror 151 (for example, a free-form mirror or a mirror asymmetric in light axis) and the other mirror 152. On the other hand, a driver 105 sees an image projected on the windshield 103 or the combiner 200 to visually recognize the image as a virtual image ahead through the transparent windshield 103. At this time, the mirror 151 may be replaced with a concave mirror, and the other mirror 152 may be replaced with a cold mirror. Here, in order to avoid the redundant description, an example in which the image light is projected onto the combiner 200 will be described.

FIG. 1(*b*) shows an example of an internal configuration of the HUD device 100, in particular, the image display apparatus 300 thereof. As can be seen from this drawing, the case in which the image display apparatus 300 constitutes a projector is shown, and the image display apparatus 300 includes, for example, alight source 301, alighting optical system 302, and a display element 303. Note that illumination light suitable for the projection can be generated by adopting a light source device according to the present invention to be described later in detail as the light source 301.

In this example, the image display apparatus 300 includes the lighting optical system 302 which collects and uniforms the illumination light generated by the light source 301 and irradiates the display element 303 with the uniformed light and the display element 303 which generates the image to be projected. However, as shown in FIG. 4, these constituent elements are already included in the light source device (see light source device case 11 of FIG. 3) of the present invention as a combined diffusion block 16, a first diffuser 18*a*, a light guide 17, and a second diffuser 18*b*, and further as a liquid crystal display panel 52 in the embodiment described below. Therefore, a light source device 10 (see FIG. 3) of the present invention can be directly used as the image display apparatus 300 of the HUD device 100. Accordingly, it is possible to realize the HUD device 100 that can be easily installed in a narrow space such as a dashboard in an automobile. Note that it may be obvious for a person having ordinary skill in the art that the light emitted from the image display apparatus 300 is projected onto the windshield 103 of the vehicle 102 or the combiner 200 further through a display distance adjusting mechanism 400 and a mirror driver 500.

Figure 2:
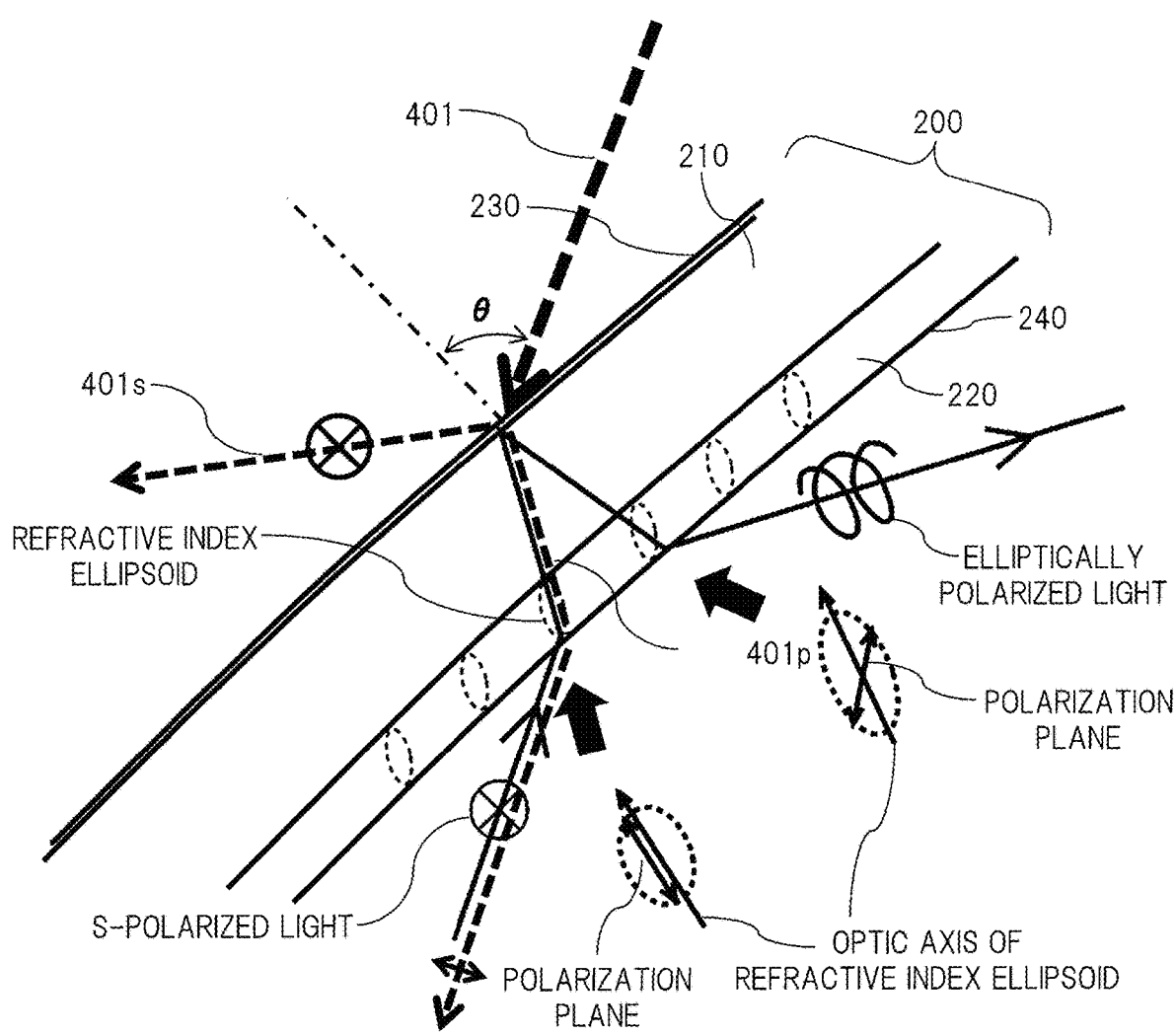
FIG. 2 is a diagram for describing a principle in the present invention for solving the problem of the prior art.

Next, the principle of solving the above-described issue of the present invention, that is, the problem that a driver cannot see a virtual image displayed on the windshield of the vehicle 102 or the combiner 200 by linearly polarized light from the HUD device 100 when wearing sunglasses having polarization function (hereinafter, referred to also as "polarizing sunglasses") will be described with reference to FIG. 2. Note that this drawing shows the case in which the image light from the HUD device 100 is displayed on the combiner 200 instead of the windshield 103. However, it may be obvious for a person having ordinary skill in the art that the same is true of the case in which the image light from the HUD device 100 is projected onto the windshield 103.

In the combiner 200, for example, a polymer film 220 is formed on a front surface (surface facing a driver side or surface on a right side in the drawing) of a substrate 210 made of a transparent plate-shaped member such as a polycarbonate plate or a glass plate. Note that, in the polymer film 220, refractive index ellipsoids formed of polymer are arranged in a predetermined direction as indicated by dashed ovals in the drawing. In addition, a reference character 230 in the drawing denotes a half mirror attached on a back surface of the substrate 210 and a reference character 240 denotes an anti-reflection (AR) film formed on a surface of the polymer film 220, that is, an outermost surface of the combiner 200.

A relationship between the optic axis and the polarization plane of the refractive index ellipsoid of the polymer film 220 in a normal cross section with respect to an incident light in a case in which the image light of s-polarized light from the HUD device 100 is incident on the combiner 200 as indicated by solid arrows in the drawing is shown on a lower left side of the drawing. Namely, the polymer film 220 is attached so that the direction of the optic axis of the refractive index ellipsoid corresponding to the optic axis of the polymer film 220 coincides with the polarization plane of the light incident on the combiner 200.

With the configuration described above, the light incident on the combiner 200 propagates as the linearly polarized light along the optic axis of the polymer film 220. In terms of results, since the light is incident on a surface of the half mirror 230 as the linearly polarized light of the s-polarized light, the half mirror can reflect the light beam constituting the image of the HUD at high reflectance.

Thereafter, the light beam is reflected by the half mirror 230 on the back surface of the substrate 210, and is incident again on the polymer film 220. Meanwhile, since the reflected light from the combiner 200 is changed in the traveling direction, the relationship between the optic axis and the polarization plane of the polymer film 220 in the normal cross section of the reflected light is changed so as to have different angles as shown on a lower right side of the drawing. Therefore, the linearly polarized light reflected by the half mirror 230 becomes elliptically polarized light due to the influence of the retardation of the polymer film as propagating in the polymer film 220.

Namely, the image light of the s-polarized light from the HUD device 100 is incident as the elliptically polarized light by the action of the polymer film 220 constituting the combiner 200 when reaching the eyes of the driver. The general polarizing sunglasses have the characteristics of blocking the s-polarized light with respect to the road surface and the windshield in order to block the glare of the road surface and the reflected light of the windshield. Therefore, in the conventional general HUD optical system, the HUD image cannot be recognized when wearing the polarizing sunglasses. However, the light of the HUD image reflected by the windshield or the combiner is converted into the elliptically polarized light in the present invention, and thus the HUD image can be recognized even when wearing the polarizing sunglasses.

Note that, in the example mentioned above, the polymer film 220 in which refractive index ellipsoids formed of polymer are arranged in a predetermined direction has been described as one means of converting the s-polarized light into the elliptically polarized light, but the present invention is not limited to this, and it is possible to use other means having the same effect as that described above. In addition, in the description above, as the position of the polarization conversion means, the polymer film 220 is formed on the front surface (surface facing a driver side) of the substrate 210 of the combiner 200. However, the present invention is not limited to this, and the polarization conversion means may be installed on the light path in which the polarized image light from the image display apparatus 300 propagates, more specifically, on a part of the light path from an image light emission surface of the liquid crystal display panel 52 to an inner surface of the combiner 200 (or windshield 103).

As to a manufacturing method of the polymer film, the polymer film is manufactured by sandwiching a relatively high photoelastic film such as polycarbonate by metal plates having high heat resistance or the like and applying a shear stress while heating to a temperature of t ° C. The temperature of t ° C. is preferably equal to or higher than the temperature of the thermal softening point of the polymer film and lower than the melting temperature. Here, the polymer film is made of polycarbonate and the heating temperature is set to 127° C. Note that the manufacturing method of the polymer film is not limited to that described above and can be selected as appropriate according to the material and characteristics.

In addition, it is necessary to consider the damages on the HUD device by the sunlight. When the sun is present in a specific direction (direction of θ with respect to the reflection surface of the combiner 200 in FIG. 2) as shown by a light beam 401 indicated by a thick dashed line in FIG. 2, the light beam travels reversely as indicated by a light beam 401p in the light path of the HUD image light to reach the image display apparatus 300, and there is the possibility that the image display apparatus may be damaged.

In the present invention, in order to prevent the damage described above, the reflectance of the s-polarized light of the half mirror 230 is set to 50% or higher for the light incident on the combiner at an incident angle θ from outside as described above. By adopting this configuration, 50% or more of the s-polarized light of the sunlight with respect to the surface of the combiner is reflected to the outside as indicated by a light beam 401s, and the remaining light beam 401p travels reversely in the light path of the HUD image light. Since the s-polarized light component and p-polarized light component of the light beam 401p are parallel to or perpendicular to the optic axis of the refractive index ellipsoid of the polymer film as with the HUD image light, the light beam propagates while maintaining the polarization state. Thereafter, the light beam is reflected by the mirror 151 shown in FIG. 1 and is further reflected by the other mirror 152, and is then incident on the image display apparatus 300. Here, the other mirror 152 is configured as a so-called cold mirror having a higher reflectance to a visible light and a lower reflectance to an infrared light, and is further configured to have polarization characteristics that the reflectance to the s-polarized light in a visible light range is as high as 90% and the reflectance to the p-polarized light is 30% or lower. With this configuration, a large part of the p-polarized light component of the light beam 401p passes through the other mirror 152 and does not reach the image display apparatus 300 as shown in the drawing. Note that, in order to provide the polarization characteristics described above, the incident angle φ of the main light beam to the other mirror 152 is desirably 30 degrees or more. When the incident angle of the main light beam is less than 30 degrees, it is difficult to exhibit the sufficient change in reflectance characteristics by the polarization direction. By adopting this configuration, a large part of the p-polarized light component is cut with respect to the surface of the combiner, and the remaining s-polarized light component becomes a main component. Therefore, the sunlight that reaches the image display apparatus 300 has the p-polarized light component of 30% or less and the s-polarized light component of 50% or less, that is, 40% or less in average in comparison with the sunlight in the visible light range incident on the combiner 200. Furthermore, almost all of the infrared light is cut by the other mirror 152, so that the damage by the sunlight on the image display apparatus 300 can be greatly reduced.

Meanwhile, since the HUD image light is emitted as the s-polarized light from the display element 303 to the combiner 200, 90% or more of the visible light beam is reflected by the other mirror 152 and the influence of the other mirror 152 on the image light is small. Also, though not shown, the similar effect can be achieved by installing a polarization filter that blocks polarized light to be the p-polarized light with respect to the combiner 200 between the combiner 200 and the image display apparatus 300 instead of providing the above-described polarization characteristics to the other mirror 152. Further, the half mirror 230 can achieve the above-described characteristics by stacking dielectric multilayer films in a predetermined number of layers. Note that the protection measures from the damage on the HUD device by the sunlight in the case of the combiner have been described above, and in the case in which the image light is reflected by the windshield instead of the combiner, it may be obvious for a person having ordinary skill in the art that the same measures should be taken to the external surface of the windshield.

<Detailed Structure of Image Display Apparatus>

Next, the configuration of the image display apparatus 300 that emits the image light of the s-polarized light in the HUD device 100, in particular, the configuration for realizing the HUD device which is suitable for the modularization, is reduced in size and has high light use efficiency will be described below in detail.

Figure 3:
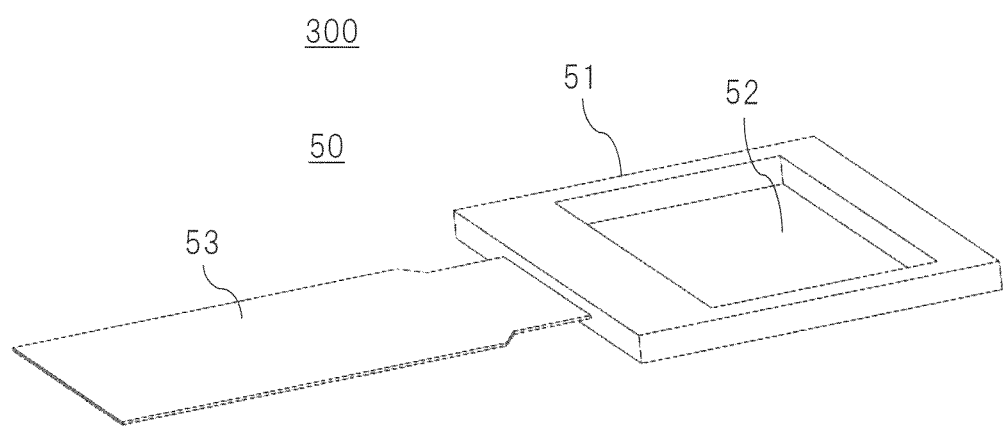
FIG. 3 is an exploded perspective view showing an overview of a light source device of an image display apparatus according to a first embodiment of the present invention.
Figure 3:
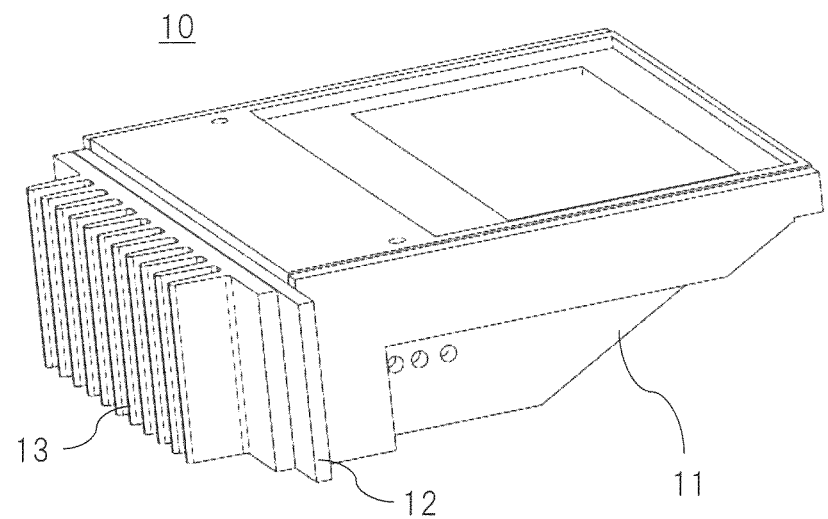
Figure 4:
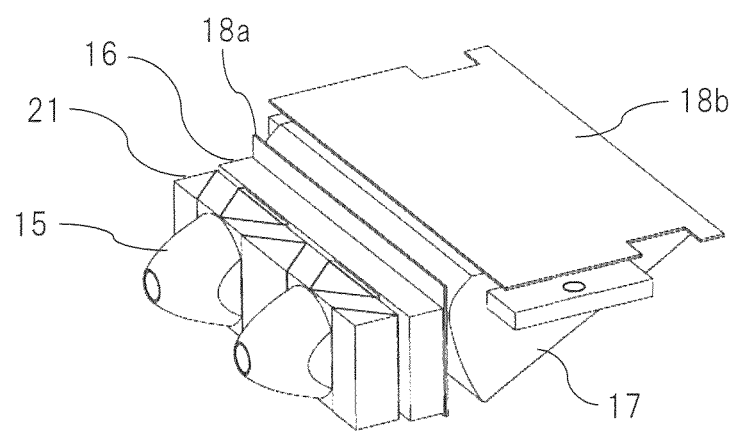
FIG. 4 is a perspective view showing an overview of an optical system of the light source device of the image display apparatus according to the first embodiment of the present invention.

FIG. 3 is an exploded perspective view showing an overview of the image display apparatus 300 according to an embodiment of the present invention. As can be seen from the drawing, the image display apparatus (main body) 300 is configured of, for example, a light source device case 11 which is made of plastic or the like and houses an LED, a collimator, a combined diffusion block, a light guide and others to be described later in detail. A liquid crystal display element 50 is attached to an upper surface thereof. In addition, an LED board 12 on which an LED (Light Emitting Diode) element serving as a semiconductor light source and a control circuit thereof are mounted is attached to one side surface of the light source device case 11, and a heat sink 13 for dissipating the heat generated in the LED element and the control circuit is attached to an outer side surface of the LED board 12.

Further, the liquid crystal display element 50 attached to the upper surface of the light source device case 11 is configured of a liquid crystal display panel frame 51, the liquid crystal display panel 52 attached to the frame, and an FPC (Flexible Printed Circuits: flexible printed circuit board) 53 electrically connected to the panel. Namely, though described later in detail, in the liquid crystal display panel 52, the image to be displayed is generated and controlled by the control signal from the control circuit (not shown) constituting the electronic device together with the LED element which is a solid state light source.

Hereinafter, the interior of the image display apparatus 300, that is, the configuration of the optical system housed in the light source device case 11 will be described in detail with reference to FIGS. 4 to 13.

Figure 5:
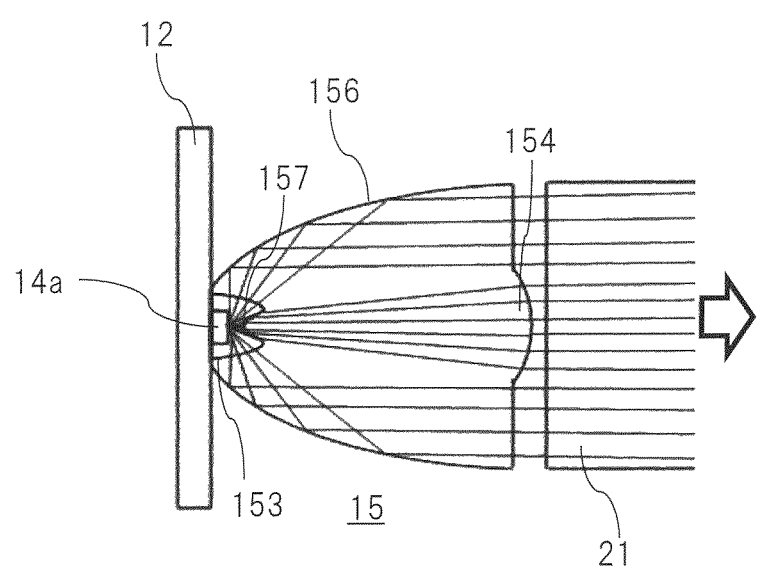
FIG. 5 is a cross-sectional view for describing details of a collimator in the image display apparatus according to the first embodiment.

In FIG. 4, a plurality of (two in this example) LEDs 14a and 14b (not shown) constituting the light source are attached to LED collimators 15 at predetermined positions. Note that each of the LED collimators 15 is formed of, for example, translucent resin such as polycarbonate. Also, as shown in FIG. 5, the LED collimator 15 has a conical convex outer peripheral surface 156 obtained by rotating a substantially parabolic cross section, and a concave portion 153 having a convex portion (that is, convex lens surface) 157 at its central portion is formed at the top of the LED collimator 15. In addition, a convex lens surface projecting to outside (or a concave lens surface recessed to inside) 154 is formed at a central portion of a flat portion of the LED collimator 15. Note that the parabolic surface (outer peripheral surface) 156 forming the conical outer peripheral surface of the LED collimator 15 has a reflection surface formed so as to be set within an angle range capable of totally reflecting the light emitted in the peripheral direction from the LED 14a or 14b therein.

On the other hand, the LEDs 14a and 14b are each disposed at predetermined positions on the surface of a circuit board thereof, that is, the LED board 12. As can be seen from FIG. 5, the LED board 12 is fixed to the LED collimator 15 so that the LED 14a or 14b on the surface of the LED board 12 is disposed at the position of the central portion of the concave portion 153 of the LED collimator 15.

With the configuration described above, the light emitted from the central portion of the LED 14a or 14b in an upward direction (to the right in FIG. 5) is collected to be parallel light by the two convex lens surfaces 157 and 154 forming the outer shape of the LED collimator 15 as indicated by arrows in FIG. 5, and the light emitted from the other part in the peripheral direction is reflected by the parabolic surface (outer peripheral surface) 156 forming the conical outer peripheral surface of the LED collimator 15 and is then similarly collected to be parallel light. In other words, with the LED collimator 15 in which the convex lens is formed at the central portion thereof and the parabolic surface (outer peripheral surface) 156 is formed in the peripheral portion thereof, almost all of the light generated from the LED 14a or 14b can be taken as the parallel light, and the use efficiency of the generated light can be improved.

Figure 6:
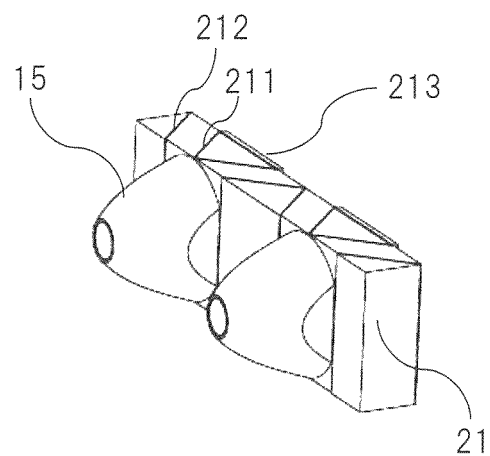
FIG. 6 is a perspective view showing an arrangement structure of the collimator and a polarization conversion element in the image display apparatus according to the first embodiment.

Note that, on a light emission side of the LED collimator 15, a polarization conversion element 21 to be described later in detail is provided. As shown in FIG. 6, the polarization conversion element 21 is configured by combining a plurality of translucent members having a columnar shape whose cross section is parallelogramic (hereinafter, parallelogram column) and a plurality of translucent members having a columnar shape whose cross section is triangular (hereinafter, triangular column) so as to be arranged in an array in parallel to the surface perpendicular to the light axis of the parallel light from the LED collimator 15. Further, at the interfaces between the adjacent translucent members arranged in an array, a polarizing beam splitter (hereinafter, abbreviated as "PBS") film 211 and a reflection film 212 are alternately provided, and a half wave plate 213 is provided on an emission surface from which the light which has been incident on the polarization conversion element 21 and has passed through the PBS film 211 is emitted.

Figure 7:
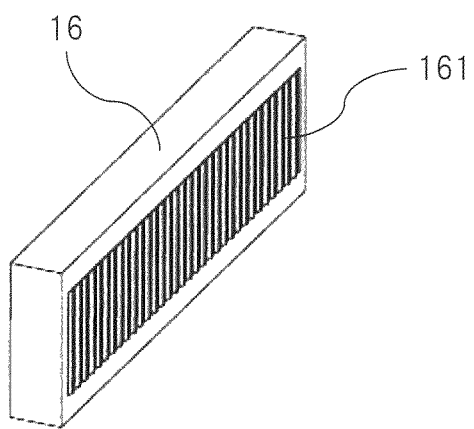
FIG. 7 is a perspective view showing a combined diffusion block disposed on an emission surface of the polarization conversion element in the image display apparatus according to the first embodiment.

The combined diffusion block 16 having a rectangular shape shown in FIG. 7 is further provided on the emission surface of the polarization conversion element 21. Namely, after the light emitted from the LED 14a or 14b becomes the parallel light by the action of the LED collimator 15 and is incident on the combined diffusion block 16, the light is diffused by texture 161 on an emission side and then reaches the light guide 17 described later.

Here, with reference to FIG. 4 again, the light guide 17 having a columnar shape whose cross section is substantially triangular is provided on an emission surface side of the combined diffusion block 16 with a first diffuser 18a interposed therebetween, and a second diffuser 18b is attached to an upper surface of the light guide 17. With this configuration, the parallel light of the LED collimator 15 is reflected upward in the drawing by the action of the light guide 17 and is guided to the incident surface of the liquid crystal display element 50. At that time, the intensity of the incident light is uniformed by the first and second diffusers 18a and 18b.

Details of the light guide 17 constituting the image display apparatus 300 will be described below with reference to the drawings. Note that FIG. 8 (a) is a perspective view showing the whole of the light guide 17, FIG. 8(b) is a cross-sectional view of the light guide 17, and FIGS. 8(c) and 8(d) are partially enlarged cross-sectional views showing details of the cross section.

The light guide 17 is a member made of translucent resin such as acrylic resin and formed into a rod shape whose cross section is substantially triangular (see FIG. 8(b)), and includes a light guide incident portion (surface) 171 facing the emission surface of the combined diffusion block 16 with the first diffuser 18a interposed therebetween, a light guide reflection portion (surface) 172 forming a sloped surface, and a light guide emission portion (surface) 173 facing the liquid crystal display panel 52 of the liquid crystal display element 50 with the second diffuser 18b interposed therebetween as can be seen from FIG. 4 and FIG. 8(a).

Figure 8:
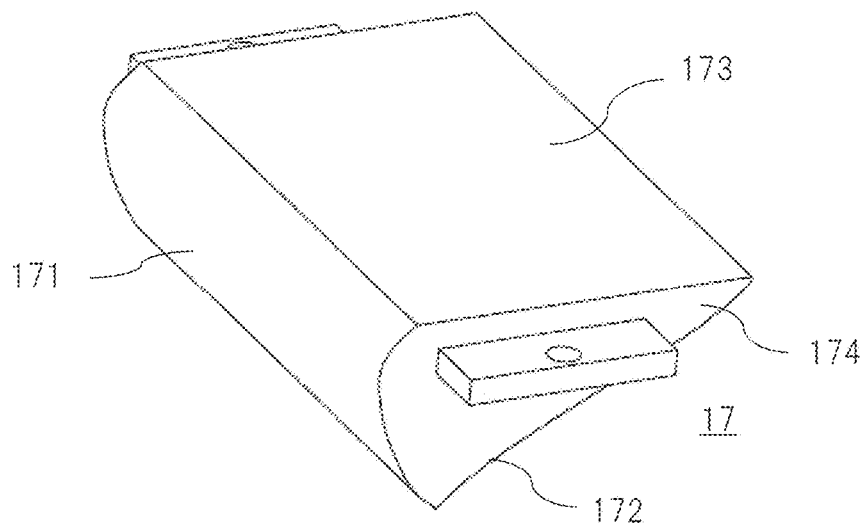
FIG. 8 is a perspective view, a cross-sectional view and a partially enlarged cross-sectional view showing details of a light guide in the image display apparatus according to the first embodiment.
Figure 8:
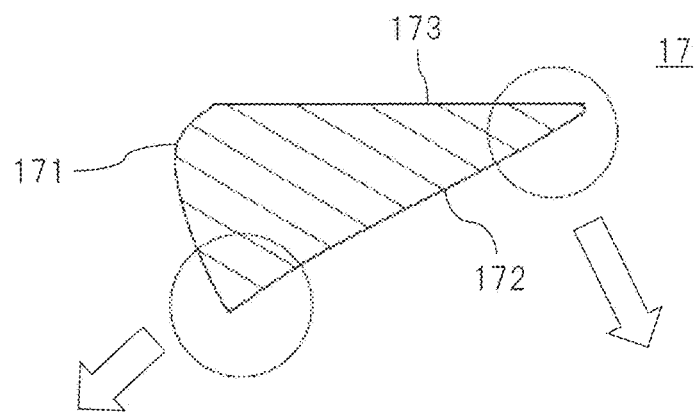
Figure 8:
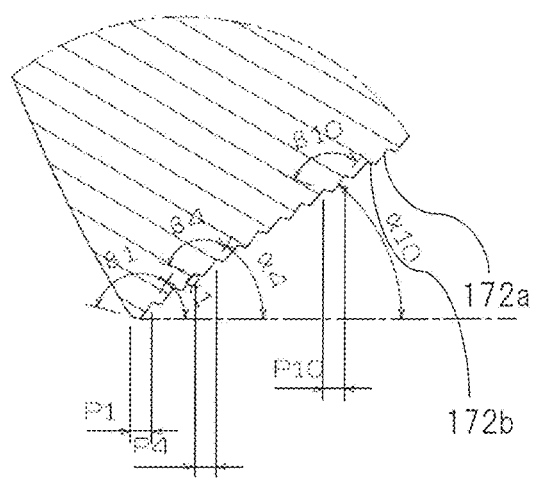
Figure 8:
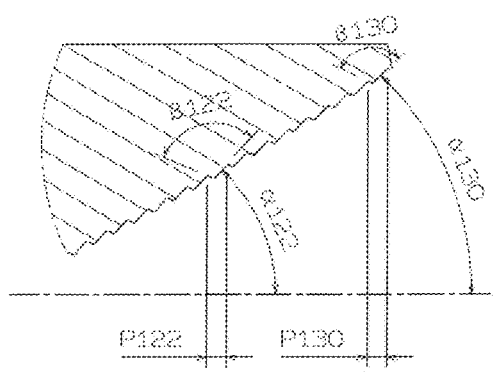

As shown in the partially enlarged cross-sectional views of FIGS. 8 (c) and 8(d), a large number of reflection surfaces 172a and connection surfaces 172b are alternately formed in a sawtooth shape on the light guide reflection portion (surface) 172 of the light guide 17. Also, the reflection surface 172a (line segment rising to the right in the drawing) forms $\alpha n$ (n: natural number of 1 to 130 in this example) with respect to the horizontal plane indicated by a dot-and-dash line in the drawing, and the $\alpha n$ is set to, for example, 43 degrees or less (but 0 degrees or more) in this case.

On the other hand, the connection surface 172b (line segment descending to the right in the drawing) forms $\beta n$ (n: natural number of 1 to 130 in this example) with respect to the reflection surface. Namely, the connection surface 172b of the reflection portion is inclined at an angle to be shaded from the incident light in the range of the half value angle of a scatterer described later. Though described later in detail, $\alpha 1, \alpha 2, \alpha 3, \alpha 4, \ldots$ form the elevation angles of the reflection surfaces, and $\beta 1, \beta 2, \beta 3, \beta 4, \ldots$ form the relative angles between the reflection surfaces and the connection surfaces and are set to, for example, 90 degrees or more (but 180 degrees or less). In this example, $\beta 1 = \beta 2 = \beta 3 = \beta 4 = \ldots = \beta 122 = \ldots \beta 130$ holds.

Figure 9:
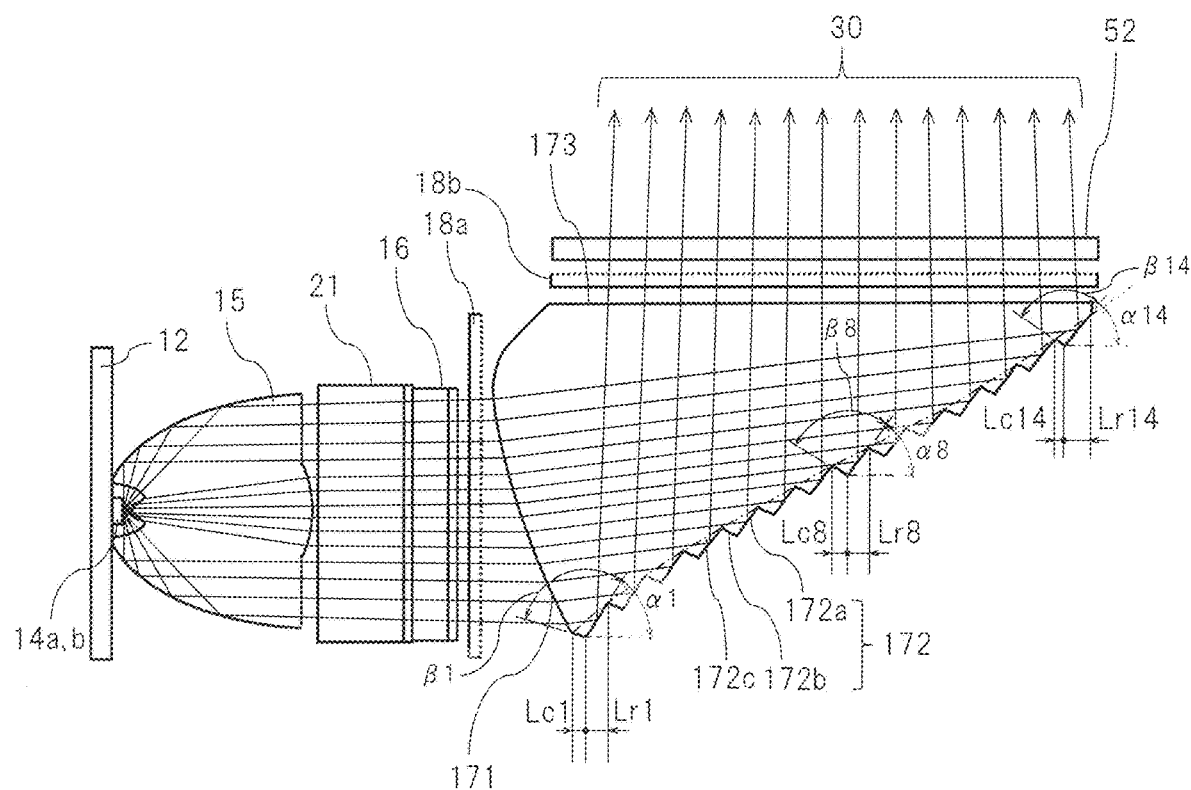
FIG. 9 is an enlarged cross-sectional view showing reflection surfaces and connection surfaces constituting the light guide and details of reflection of light beam in the image display apparatus according to the first embodiment.
Figure 10:
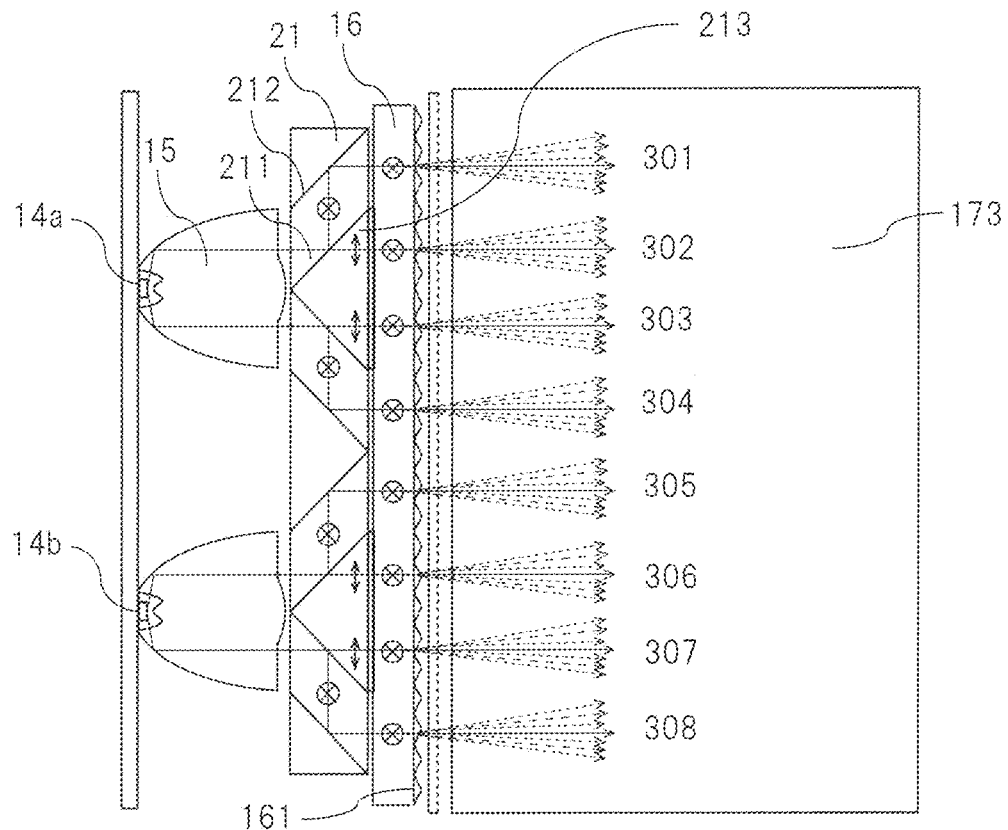
FIG. 10 is a top view and a side cross-sectional view showing a configuration in the image display apparatus and a state of light beam according to the first embodiment.
Figure 10:
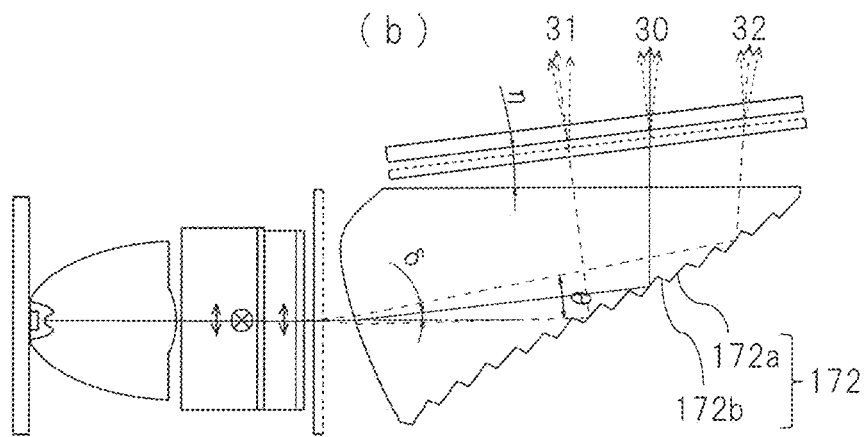

FIG. 9 and FIG. 10 are schematic views showing the reflection surfaces 172a and the connection surfaces 172b in an enlarged manner with respect to the light guide 17 for easier understanding. On the light guide incident portion (surface) 171 of the light guide 17, the main light beam is deflected by $\delta$ in the direction of increasing the incident angle with respect to the reflection surface 172a (see FIG. 10(b)). Namely, the light guide incident portion (surface) 171 is formed to have a curved convex shape inclined toward the light source side. Accordingly, the parallel light from the emission surface of the combined diffusion block 16 is incident after being diffused through the first diffuser 18a, and reaches the light guide reflection portion (surface) 172 while being slightly bent (deflected) upward by the light guide incident portion (surface) 171 as can be seen from the drawing (see comparative example of FIG. 11).

Note that a large number of reflection surfaces 172a and connection surfaces 172b are alternately formed in a sawtooth shape on the light guide reflection portion (surface) 172, and the diffused light is totally reflected upward by each of the reflection surfaces 172a and is then incident on the liquid crystal display panel 52 of the liquid crystal display element 50 as parallel diffused light through the light guide emission portion (surface) 173 and the second diffuser 18b as shown in FIG. 4. Therefore, the elevation angles $\alpha 1, \alpha 2, \alpha 3, \alpha 4, \ldots$ of the reflection surfaces are set so that each reflection surface 172a forms an angle greater than the critical angle with respect to the diffused light, and the relative angles $\beta 1, \beta 2, \beta 3, \beta 4, \ldots$ between the reflection surfaces 172a and the connection surfaces 172b are set to constant angles as described above, more preferably to 90 degrees or more ($\beta n \geq 90$ degrees) though the reason therefor will be described later.

Figure 11:
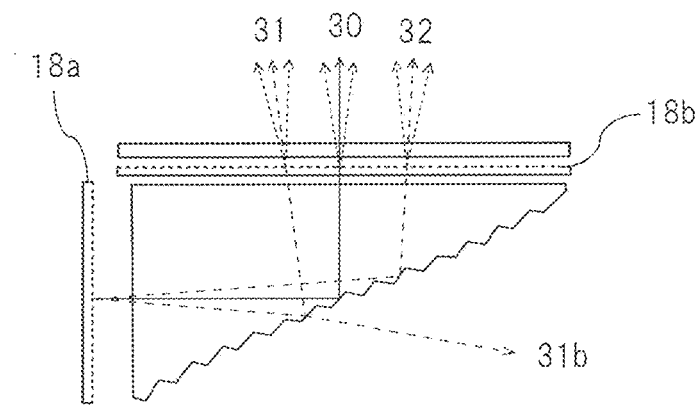
FIG. 11 is a diagram showing a comparative example for describing an action of the light guide in the image display apparatus according to the first embodiment.

With the configuration described above, each reflection surface 172a always forms the angle greater than the critical angle with respect to the diffused light, and thus the total reflection can be achieved without forming a reflection film such as a metal film on the light guide reflection portion (surface) 172, so that the light source device can be realized at low cost. Meanwhile, as shown in FIG. 11 corresponding to a comparative example, when the main light beam is not bent (deflected) by the light guide incident portion of the light guide 17, a part of the diffused light forms an angle smaller than the critical angle with respect to the reflection surface 172a, and the sufficient reflectance cannot be secured, so that the light source device with good (bright) characteristics cannot be realized.

Also, the elevation angles $\alpha 1, \alpha 2, \alpha 3, \alpha 4, \ldots$ of the reflection surfaces have values gradually increasing as moving from the lower portion to the upper portion of the light guide reflection portion (surface) 172. This is because, since the light that has passed through the liquid crystal display panel 52 of the liquid crystal display element 50 has a divergence angle to a certain degree, the configuration in which the light beam in a peripheral portion is slightly deflected in a central axis direction as indicated by the light beam 30 in FIG. 9 needs to be realized in order to prevent the occurrence of a so-called vignetting in which a part of the light that has passed through the peripheral portion of the liquid crystal display panel 52 is dimmed by an peripheral edge of the mirror disposed downstream.

Figure 12:
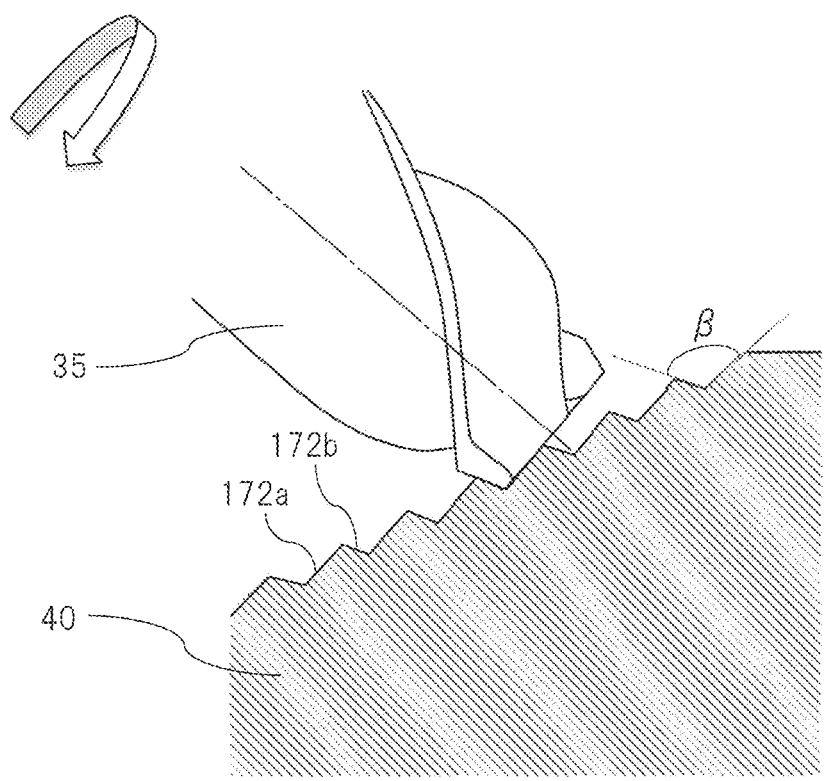
FIG. 12 is a diagram for describing a processing method of a molding die used to form the light guide of the image display apparatus according to the first embodiment.

As described above, the relative angles $\beta 1, \beta 2, \beta 3, \beta 4, \ldots$ are set to satisfy $\beta n \geq 90$ degrees. This is because the reflection surfaces 172a and the connection surfaces 172b can be simultaneously processed with an end mill 35 having a relative angle of $\beta$ between a bottom surface and a side surface in the processing of a molding die 40 for fabricating the light guide 17 by the injection molding as shown in FIG. 12. Also, since the processing with a relatively large tool is possible for the reflection surface 172a and the connection surface 172b, the processing time can be significantly reduced and the processing cost can be significantly reduced. In addition, the boundary edge between the reflection surface 172a and the connection surface 172b can be processed with high accuracy, and the light guide characteristics of the light guide 17 can be improved.

Further, Lr1, Lr2, Lr3, Lr4, . . . in FIG. 9 each indicate a projection length of the reflection surface 172a with respect to the horizontal plane, and Lc1, Lc2, Lc3, Lc4, . . . each indicate a projection length of the connection surface 172b with respect to the horizontal plane. Also, Lr/Lc, that is, a ratio between the reflection surface 172a and the connection surface 172b is adjustable according to location. An intensity distribution of the main light beam 30 that is incident on the light guide 17 does not always coincide with an intensity distribution desired on the incident surface of the liquid crystal display panel 52. Thus, the configuration in which the intensity distribution is adjusted by the ratio Lr/Lc between the reflection surface 172a and the connection surface 172b is adopted. Note that, as the ratio is made higher, the average intensity of the reflected light at that portion can be increased. Since the light beam 30 that is incident on the light guide tends to be strong at the central portion in general, in order to correct it, the configuration in which the ratio Lr/Lc is variable according to location is adopted and the intensity is reduced particularly at the central portion. Since the configuration in which the ratio Lr/Lc is variable according to location and the elevation angles $\alpha 1, \alpha 2, \alpha 3, \alpha 4, \ldots$ of the reflection surfaces have different values according to location is adopted, an envelope 172c indicating a general shape of the light guide reflection portion (surface) 172 has a curved shape as shown in FIG. 9.

Further, Lr1+Lc1=Lr2+Lc2=Lr3+Lc3=Lr4+Lr4 . . . =Lr+Lc is set to 0.6 mm or less ($\leq$0.6 mm). By adopting this configuration, the repetition pitch of the reflection surface seen from the light guide emission portion (surface) 173 of the light guide 17 can be made uniform. Also, since the pitch is 0.6 mm or less, when viewed through the liquid crystal display panel 52, the individual emission surfaces are not separated but appear as a continuous surface in combination with the actions and the effects of the diffusers 18a and 18b, so that the spatial brightness through the liquid crystal display panel 52 can be uniformed and the display characteristics can be improved. Namely, with this configuration, the intensity distribution of incident light on the liquid crystal display panel 52 can be uniformed. On the other hand, when the value of Lr+Lc is less than 0.2 mm, not only the processing time increases, but also it becomes difficult to process the reflection surfaces 172a with high accuracy, and thus the value is desirably 0.2 mm or more.

With the light guide reflection portion (surface) 172 of the light guide 17 having the shape described above, the total reflection condition of the main light can be satisfied, and the light can be efficiently reflected without the necessity of providing a reflection film such as an aluminum film on the light guide reflection portion (surface) 172, so that the evaporation process of an aluminum thin film accompanied by the increase of the manufacturing cost becomes unnecessary and the bright light source can be realized at lower cost. Also, the relative angle β is set to such an angle that the connection surface 172b is shaded with respect to the light obtained by diffusing the main light beam 30 by the combined diffusion block 16 and the diffuser 18a. Accordingly, since the unnecessary light incidence on the connection surface 172b is suppressed, the unnecessary light reflection can be reduced, and the light source device with good characteristics can be realized.

Furthermore, according to the light guide 17 described above, since a length of the light guide emission portion (surface) 173 in the light axis direction can be freely changed by setting the elevation angles α1, α2, α3, α4, . . . of the reflection surfaces as appropriate, the light source device in which the size (surface size) of the light guide emission portion (surface) 173 is changeable to a necessary size (surface size) suitable for a device such as the liquid crystal display panel 52 as appropriate with respect to the light guide incident portion (surface) 171 can be realized. This means that the light guide emission portion (surface) 173 can be formed to have a desired size without depending on the arrangement of the LEDs 14a and 14b constituting the light source, and a planar light source with a desired size can be obtained. Furthermore, this leads to securing of the degree of freedom in the design including the arrangement of the LEDs 14a and 14b constituting the light source, and this is also advantageous for the size reduction of the whole device.

In addition, according to the light guide 17 described above, by setting the connection surfaces 172b constituting the light guide reflection portion (surface) 172 as appropriate as shown in FIG. 13 (in this example, some of the reflection surfaces 172a at the central portion are configured so as not to reflect the light), the ratio Lr/Lc of the reflection surface 172a and the connection surface 172b can be changed according to location in the light guide emission portion (surface) 173 of the light guide 17. Note that the example in the drawing shows the state in which the light display on the light guide emission portion (surface) 173 of the light guide 17 is divided into right and left parts in the light axis direction. This will be particularly preferable for the case in which the screen to display the virtual image is divided into upper and lower parts or right and left parts in the HUD device.

Here, it is desirable that the inclination of the main light beam incident on the liquid crystal display panel 52 is close to the vertical in general, but the light beam may be inclined by an angle η depending on the characteristics of the liquid crystal display panel as shown in FIG. 10(b). Namely, some of the liquid crystal display panels on the market exhibit better characteristics when the incident angle is inclined by about 5 to 15 degrees, and in such a case, the angle η is desirably set to 5 to 15 degrees in accordance with the characteristics.

Also, the main light beam can be inclined with respect to the liquid crystal display panel 52 by adjusting the angle of the reflection surface 172a instead of inclining the liquid crystal display element 50 by the angle η. Further, when the light beam needs to be inclined toward the side surface of the light guide, this can be realized by making the inclined surface of the triangular texture 161 formed on the emission surface of the combined diffusion block 16 laterally asymmetrical or by changing the forming direction of the texture configured of the reflection surfaces 172a and 172b.

As described above in detail, with the image display apparatus 300 according to the present invention, the modularized light source device in which the use efficiency of light from the light source and the uniform illumination characteristics thereof can be improved and which is reduced in size can be manufactured at low cost.

Namely, with the image display apparatus 300 described above, since the light incident on the liquid crystal display panel 52 constituting the liquid crystal display element 50 is converted into s-polarized light by the polarization conversion element 21 described above, the transmittance of the light in the liquid crystal display panel 52 can be improved. Accordingly, the modularized light source device which is reduced in size and has high efficiency can be realized with a smaller number of light sources (LEDs) at lower cost. Note that, although the case in which the polarization conversion element 21 is attached behind the LED collimator 15 has been described above, the present invention is not limited to this, and it may be obvious for a person having ordinary skill in the art that the same functions and effects can be obtained even by providing it on the light path to reach the liquid crystal display element.

Other Embodiment

As shown in FIG. 14, the light guide 17 disposed behind the combined diffusion block 16 may be configured of a polarization conversion element (light guide 17') instead of the normal translucent resin. In this configuration, as can be seen from the drawing, a translucent member 211' of a triangular column and a translucent member 212' of a parallelogram column are combined, and a PBS film 211 which reflects s-polarized light (see signs (X) in the drawing) of the incident light emitted from the LED 14a or 14b and converted into parallel light by the LED collimator 15 but passes p-polarized light (see vertical arrows in the drawing) is formed at a boundary surface between the translucent members 211' and 212'. Further, a half wave plate 213 is formed on an upper surface of the translucent member 212' of a parallelogram column and a reflection film 212 is formed on a side surface thereof.

With the configuration described above, as can be seen from the drawing, the incident light emitted from the LED 14a or 14b and converted into the parallel light by the LED collimator 15 is polarized into s-polarized light by the light guide 17' configured of the polarization conversion element alternative to the light guide 17, and is then emitted upward from the upper surface of the element. Namely, in the configuration described above, the significant reduction in size of the device and the reduction in manufacturing cost of the device can be achieved particularly by eliminating the light guide 17 made of normal translucent resin.

Various configurations of the image display apparatus for realizing the HUD device suitable for the modularization, reduced in size, and having high light use efficiency according to the embodiments of the present invention have been described above. However, as with the case described above, the image light of s-polarized light from the image display apparatus to the windshield or the combiner is converted into elliptically polarized light by the function of the polymer film 220 constituting the windshield or the combiner before reaching the eyes of the driver, so that the driver can visually recognize the HUD image even when wearing polarizing sunglasses.

In the foregoing, various embodiments have been described in detail. However, the present invention is not limited to the above-described embodiments and includes various modifications. For example, the embodiments above have described the entire device in detail in order to make the present invention easily understood, and the present invention is not necessarily limited to those having all the described configurations. Also, apart of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

100 . . . HUD device, 300 . . . image display apparatus, 102 . . . vehicle, 103 . . . windshield, 200 . . . combiner, 210 . . . substrate, 220 . . . polymer film, 230 . . . half mirror, 50 . . . liquid crystal display element, 10 . . . light source device, 11 . . . light source device case, 12 . . . LED board, 13 . . . heat sink, 50 . . . liquid crystal display element, 51 . . . liquid crystal display panel frame, 52 . . . liquid crystal display panel, 53 . . . FPC (flexible printed circuit board), 14a, 14b . . . LED, 15 . . . LED collimator, 17 . . . light guide, 18a, 18b . . . diffuser, 172a . . . reflection surface, 172b . . . connection surface, 16 . . . combined diffusion block, 161 . . . texture, 21 . . . polarization conversion element, 211 . . . PBS film, 212 . . . reflection film, 151 . . . mirror, 152 . . . the other mirror

The invention claimed is:

1. A head up display device to project an image onto a windshield of a vehicle or a combiner installed in front of the windshield and provide a driver with the image based on a virtual image obtained from reflected light of the windshield or the combiner, the head up display device comprising:
    an image display apparatus configured to project the provided image onto the windshield or the combiner by polarized light; and
    a polarization conversion element configured to convert polarization of the polarized light of the image projected from the image display apparatus into elliptical polarization, the polarization conversion element being provided on a part of a first light path and a second light path as a common element, the first light path being a path from the image display apparatus through a front surface of the windshield or the combiner to the back surface of the windshield or the combiner, the second light path being a path from the back surface of the windshield or the combiner back to the front surface of the windshield or the combiner,
    wherein the polarization conversion element is configured of a film in which a direction of the first light path and a direction of an optic axis of a refractive index ellipsoid are approximately the same, but a direction of the second light path and a direction of the optic axis of the refractive index ellipsoid are different.

2. The head up display device according to claim 1, wherein the polarization conversion element is provided in an inner part of the windshield or the combiner.

3. The head up display device according to claim 1, wherein the image display apparatus includes:
    a solid state light source;
    a collimator configured to convert light from the solid state light source into substantially parallel light; and
    a display device, and
    wherein the display device is a display device using liquid crystal and a lighting optical system is configured to perform polarized illumination in a direction of increasing transmittance of the display device.

4. The head up display device according to claim 3, wherein the image display apparatus projects the image by s-polarized light on the windshield or the combiner, and
    wherein the polarization conversion element converts the s-polarized light from a light source device into elliptically polarized light.

5. The head up display device according to claim 1, wherein the polarization conversion element is configured of a polymer film in which refractive index ellipsoids are arranged in a predetermined direction.

6. The head up display device according to claim 5, wherein the polymer film is adhered to glass and the polarization conversion element converts polarization through the polymer film→a glass surface of the glass→the polymer film.

7. The head up display device according to claim 1 further comprising:
    an image display apparatus configured to project an image onto a windshield or a combiner by polarized light; and
    a half mirror formed on the windshield or the combiner,
    wherein a reflectance of s-polarized light of the half mirror is set to 50% or higher when sunlight is incident at an angle of reversely traveling a light path of image light of the head up display device.

8. The head up display device according to claim 7, wherein an optical element configured to selectively reduce a p-polarized light component with respect to the windshield or the combiner is provided between the windshield or the combiner and the image display apparatus.

9. The head up display device according to claim 8, wherein the optical element is a mirror whose reflectance of s-polarized light is 90% or higher and whose reflectance of p-polarized light is 30% or lower.

10. The head up display device according to claim 9, wherein the optical element serves also as a cold mirror.

11. The head up display device according to claim 10, wherein an incident angle φ of a main light beam emitted from the image display apparatus to the mirror constituting the optical element is 30 degrees or more.

12. The head up display device according to claim 8, wherein the optical element is a polarization filter.

13. The head up display device according to claim 1 further comprising:
    an image display apparatus configured to project an image onto a windshield or a combiner by polarized light; and
    a mirror whose reflectance of s-polarized light is 90% or higher and whose reflectance of p-polarized light is 30% or lower, the mirror being disposed between the windshield or the combiner and the image display apparatus and serving also as a cold mirror.

14. The head up display device according to claim 13, wherein an angle ϕ a main light beam emitted from the image display apparatus to the mirror constituting an optical element is 30 degrees or more.

* * * * *